United States Patent [19]

Havard et al.

[11] 4,048,547

[45] Sept. 13, 1977

[54] TORQUE RESPONSIVE DEVICE

[75] Inventors: Jean François Pierre Marie Havard, Carquefou; Michel Marceau Gaschet, Nantes; Henri Marie Dominique Charonnat, Reze, all of France

[73] Assignee: Brissonneau et Lotz, Carquefou, France

[21] Appl. No.: 540,998

[22] Filed: Jan. 14, 1975

Related U.S. Application Data

[63] Continuation-in-part of Ser. No. 365,424, May 30, 1973, abandoned.

[51] Int. Cl.[2] .................................... H02P 7/00

[52] U.S. Cl. .................................... 318/488; 318/6; 73/143; 73/136 R; 254/173 B

[58] Field of Search .................... 318/6, 689, 624, 646, 318/488; 254/172, 173 B, 175.7; 73/136 R, 143, 144, 88.5 R

[56] References Cited

U.S. PATENT DOCUMENTS

| | | | |
|---|---|---|---|
| 2,024,147 | 12/1935 | Curtiss | 265/25 |
| 3,224,262 | 12/1965 | Shipley | 73/136 |
| 3,260,106 | 7/1966 | Hull et al. | 73/144 |
| 3,330,154 | 7/1967 | Habern et al. | 73/143 |
| 3,388,070 | 6/1968 | Born et al. | 254/175.7 |
| 3,606,183 | 9/1971 | Turk | 318/6 |
| 3,624,783 | 11/1971 | Chang | 318/6 |
| 3,680,753 | 8/1972 | Shaw-Stewart | 318/6 |
| 3,693,939 | 9/1972 | Buckson | 254/172 |
| 3,695,096 | 10/1972 | Kutsay | 73/88.5 R |
| 3,838,846 | 10/1974 | Ostrom | 318/6 |

*Primary Examiner*—Robert K. Schaefer
*Assistant Examiner*—John J. Feldhaus
*Attorney, Agent, or Firm*—Bacon & Thomas

[57] ABSTRACT

The invention is a device for controlling and adjusting the tension in the cable of mooring winches or cranes by measuring the torque exerted on a speed reducer having at least one intermediate gear-train, constituted of a pinion and a larger toothed-wheel integrally connected together. The device is characterized in that this intermediate gear-train rotates freely on two bearings supported by a stationary shaft concentric with the intermediate set, which stationary shaft is carried by two fixed supports located outside the bearings. The shaft also carries at least one pair of stress gauges secured between the bearings on two diametrically opposed generatrices of the shaft which are located in the same axial plane as the resultant compression force exerted on both bearings by the two tangential forces applied on the meshing teeth of the pinion and of the wheel of the intermediate gear-train. These stress gauges measure the bending moment on the stationary shaft by modulating an electric current, said bending moment being directly proportional to the resisting torque, and said current regulating said torque by way of responsive means acting on a motor driving said intermediate gear-train.

8 Claims, 8 Drawing Figures

TORQUE RESPONSIVE DEVICE

This application is a continuation-in-part of application Ser. No. 365,424, filed May 30, 1973, now abandoned.

The present invention relates to a torque responsive device. In particular, on apparatus such as mooring winches or cranes, the device is directed to the members for controlling and adjusting the tension in the cable by measuring the torque exerted on the reducer provided with intermediate gear-trains, the reducer being located between the motor and the winding drum.

It has been known for several years how to measure even infinitesimal deformations, on a part subjected to compression or tension forces, or consequently to bending forces, by means of stress gauges. This gauge is directly secured onto the part subjected to the stresses. Compression or tension in the fibers is expressed by a variation of the characteristics of a current running through these stress gauges.

The latter are sometimes used for measuring the output torque of a driving member. They may be mounted on coupling-sleeves (thus moving parts), in order to record the pressures exerted by the driving plate on a driven plate. This assembly has the advantage of not being very cumbersome but, however, requires rotary electrical contacts whose reliability is not ensured, in a marine environment for example. On the other hand, vibrations are further to be feared for those gauges which are sensitive and fragile. The results obtained by this method are thus not satisfactory. The method is improvable which is the object of the present invention. Other methods, such as hydraulic optical or magnetic methods do exist but they are outside the scope of the present invention.

In order to measure and possibly maintain at a constant value the torque exerted by or on a device for tightening a cable or a flexible belt, another method is used. The cable or belt passes and bears upon an intermediate sheave whose support records the radial stresses exerted on the shaft of the sheave. This support may be mounted on a dynamometer or a stress detector. It may also be secured to an arm, articulated or not, whose deformations are measured. The latter are approximately proportional to the cable pull, and consequently, to the driving or resisting torque. But, in order to obtain this result which is not very accurate, use has been made of a quite combersome intermediate gear. Positioning of the measuring instrument along the cable path may also have the disadvantage of leaving the detector open to fluctuations in the temperatures and dampness of the atmosphere. Their working may be perturbed; this arrangement at least requires precautions.

In the particular case of mooring winches on ship decks, another method for controlling the tightening of cables consist in constantly exerting a predetermined torque on the winding drum. A special direct-current motor experts in important and adjustable torque upon setting up and may take back or give the necessary slack. Although this method permits an easy electrical mounting, it however has the disadvantage of being cumbersome and presents the risks of overheating and inaccuracy.

The object of the present invention is to provide a device which enables one to overcome the afore-mentioned drawbacks. It takes advantage of the accuracy and little room taken by stress gauges by mounting the latter directly on one of the parts normally used in the reducer accompanying the driving motor, without any further intermediate accessories. By being secured onto an absolutely stationary shaft carrying one of the intermediate gear-trains, these stress gauges are not subjected to any vibration. Consequently, they are protected from any outer disturbances. The stationary shaft carrying the gauges is subjected to tangential forces acting on the teeth of the driving pinion and to the driven wheel. The bending moment, which thus results between the outer supports of the stationary shaft, always lies in the same plane. Since it is always proportional to the transmitted torque and has the same direction, its measure by the stress gauges is thus accurate and reliable.

On the other hand, if the shaft carrying the gauges is near enough to the output shaft of the reducer, in the kinematic chain, the measured torque is really the one which is exerted on the operating member, for example, a winch drum. In other words, the incidence of mechanical efficiencies is practically nil on the measured values of the torque which may then be used automatically to control the force produced or received at the output of the reducer. Damping is not necessary as a result of the imperceptible movement or deformation of the detecting element.

Finally, the device for regulating the torque exerted by or on a cable winding drum is easy and is achieved with an ordinary motor which may be electric, hydraulic or pneumatic.

The present invention will become readily apparent from the following detailed description of the preferred embodiments and accompanying drawings, wherein.

Figure 1:
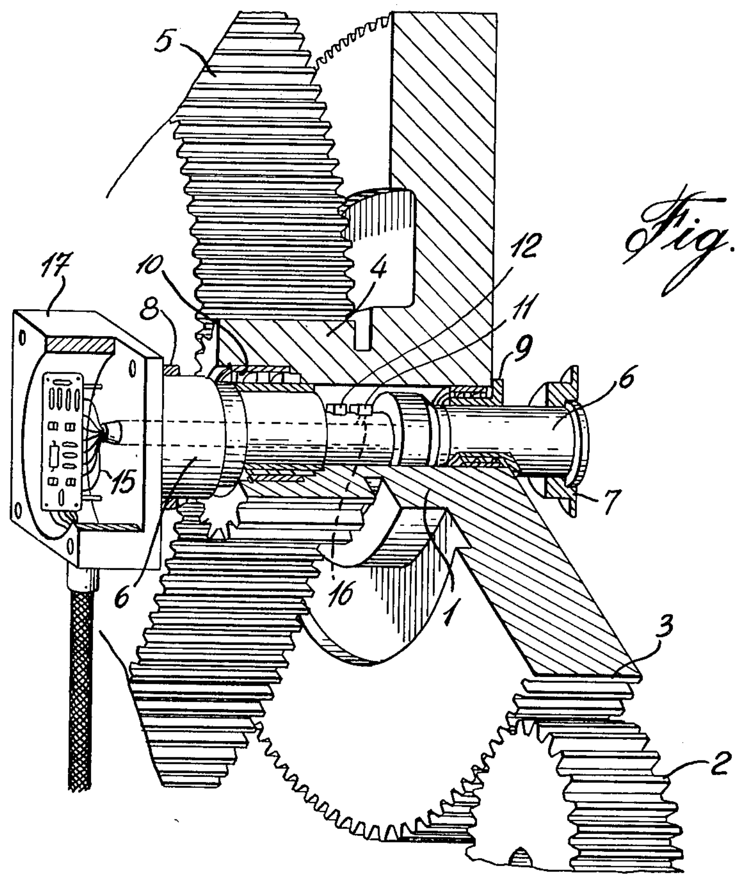
FIG. 1 is a perspective view, partly in cross-section of an intermediate pinion-wheel assembly mounted on a stationary shaft carrying the stress gauges.

Referring now to FIG. 1, the intermediate gear-train 1 or one of the intermediate trains of a speed reducer, meshes with pinion 2 (motor side) through a toothed wheel 3 rigidly associated with a pinion 4. The latter meshes with a toothed wheel 5 directly or indirectly connected to a member whose torque is to be measured. The rotary assembly 1, comprising wheel 3 and pinion 4, is hollow. A stationary shaft 6 extends through it concentrically and firmly bears upon supports 7 and 8 having relatively small bearing surfaces but perfectly adjusted.

Figure 2:
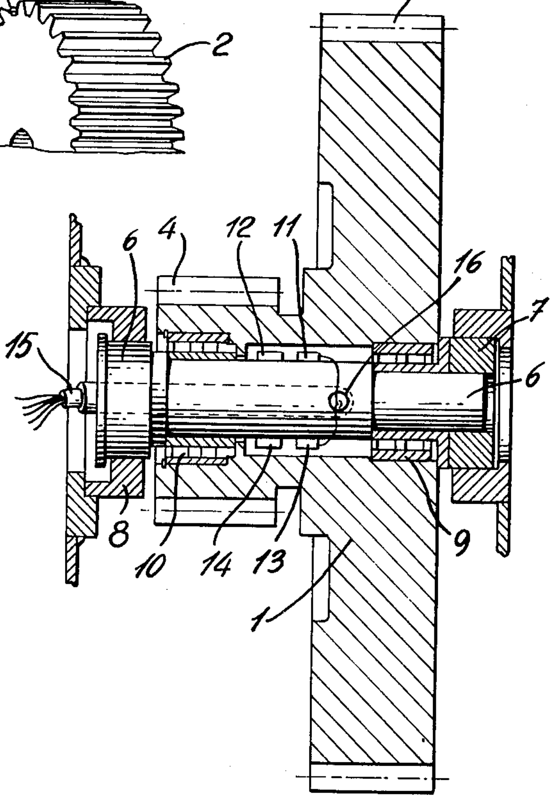
FIG. 2 is an axial cross-sectional view of the same.

Bearings 9 and 10, preferably roller bearings, enable the assembly 1 to rotate freely on shaft 6. As best shown in FIG. 2, stress gauges 11, 12, 13 and 14, which are diametrically opposed two by two, detect the bending of shaft 6. These gauges may be directly glued on the latter, but any other methods may be used to ensure attachment and adherence. Gauges 11, 12, 13 and 14 are connected in Wheatstone bridge fashion. Connecting in a complete bridge permits the following results to be obtained:

for a given stress, the voltage variation in the measuring branch of the bridge is four times that produced by a single gauge.

the temperature variations do not give rise to variations in the interference voltages.

FIG. 2 shows more clearly a cross-section of the assembly in an axial plane passing through the gauges. It is to be noted that the shaft 6 may eventually expand along its axle, without producing stresses harmful to the measurements; supports 7 and 8 are slidable.

Figure 5:
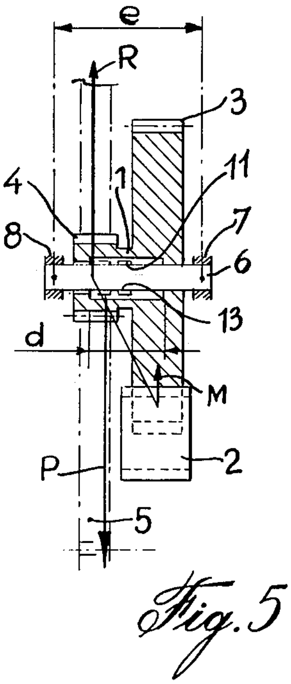
FIG. 5 is a schematic projection of the forces according to FIG. 3, in an axial plane containing P, the resulting force.
Figure 3:
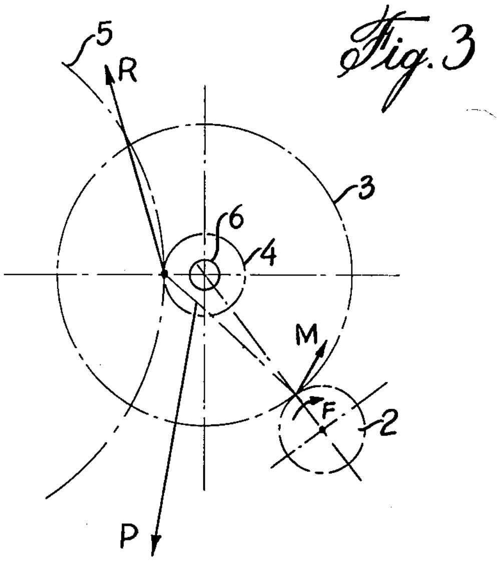
FIG. 3 is a schematic projection of the same, in a plane perpendicular to shaft axis, illustrating the forces acting on the meshing teeth and on the bending shaft.
Figure 4:
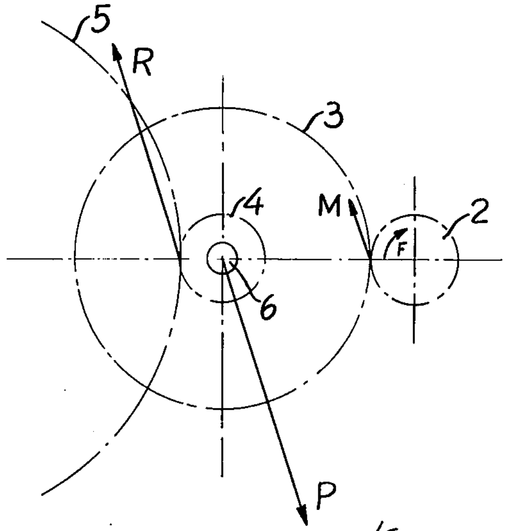
FIG. 4 is a variant of the previous projection, the driving pinion and driven wheel being in the same axial plane.

Regardless of the relative angular positions of the pinion 2 and the wheel 5 (FIGS. 3 or 4), thus of the point of application of the tangential driving force M and of the resisting force R (which may be reversed), the resulting force P on the supports 7 and 8 on the shaft 6 shows that, on the latter, a bending moment is exerted which depends on the space *e* between the fixed supports 7 and 8, on the smaller space *d* between the bearings 9 and 10 of the assembly 1 (FIG. 5) and obviously, on the value of M and R. This bending moment is directly proportional to force M (or R), the values *e and d* being constant. Its direction is reversed when M or R change their direction.

Leads 15 electrically feed the stress gauges and collect their informations on the variations of M or R, and therefore on the torque. These leads pass inside the shaft 6 which is hollow, and go from the inner cavity thereof to the gauges through radial or inclined holes 16 preferably placed in a plane perpendicular to neutral fibre, i.e. to the axis of the shaft.

The informations given by the detectors 11, 12, 13 and 14, that is the current modulated with respect to the torque, are picked-up outside the shaft in a housing 17 and amplified therein in order to act on the driving motor whose torque may be adjustable. The housing 17 may furthermore be placed at any desired distance from the shaft 6.

Figure 6:
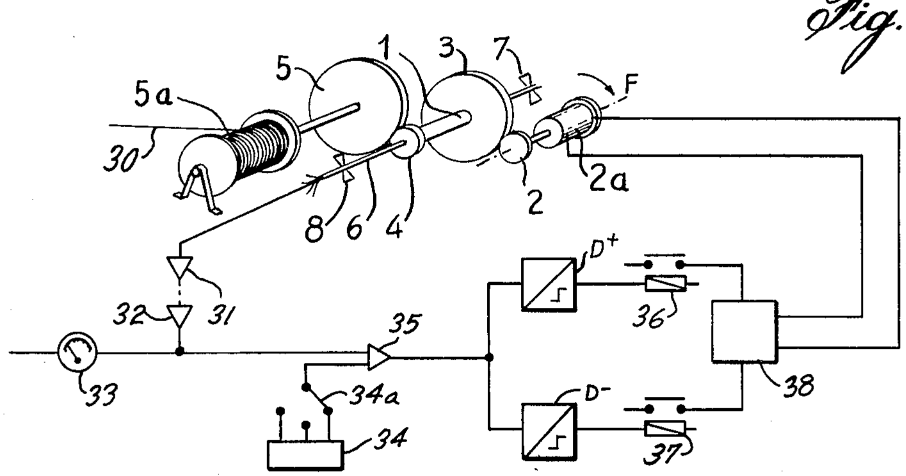
FIG. 6 is a schematic view partly in perspective of a winch drum control assembly.

FIG. 6 shows an assembly for controlling and adjusting the tightening exerted on a cable wound on a mooring winch. Members 1 to 8 shown in FIG. 6 correspond to the members bearing the same numbers in FIGS. 1 and 2. Wheel 5 is connected to a drum 5*a* winding or unwinding a cable 30, while pinion 2 is rigidly associated with the shaft of a brake-motor 2*a*. 31 shows a preamplifier positioned in the end of shaft 6 and obviously connected to the gauges or detectors not shown in FIG. 6.

The preamplifier 31 is connected to an adaptation amplifier 32 the output of which is connected to a strain indicator 33 a torque reference device 34 and to a comparator 35.

Comparator 35 is connected to two detectors in parallel: one position deviation detector D+ and a negative deviation detector D−. Each of the detectors D+ and D− is connected by a relay 36, 37 to an apparatus 38 controlling the brake motor 2*a*. The device of FIG. 6 operates in the following manner:

The electric information from the Wheatstone bridge formed by the four strain gauges mounted on shaft 6 is directly proportional to the torque applied to the intermediate shaft 1 by the tightening of cable 30.

Said electric voltage is amplified a first time by the amplifier 31 placed directly at the end of the measurement shaft 6.

The level of the measurement voltage from amplifier 31 is then sufficient for this information to be transmitted for several hundred meters without being disturbed by parasitic electric fields.

However, the electric power absorbed by the bridge of gauges and the amplifier 31, the voltages and input currents and the characteristics of these circuits and the connecting cable are compatible with the standardized conditions for operation in intrinsic security.

The measurement voltage is further amplified and calibrated at the input of the controlling apparatus by amplifier 32.

Device 34 provides a reference voltage at several levels. Each level corresponding to a torque reference value. A switch 34*a* generally connected mechanically to the manual controler enables the desired torque reference to be selected from three or four values: for example, 33%, 66% or 100% of the nominal torque.

The calibrated measurement voltage and the selected reference value are compared in the comparator 35.

The voltage from comparator 35 is zero if the real torque corresponds to the reference value. It is positive if the torque measured is greater than the reference value and negative if the torque measured is less than said value.

Finally, the voltage level from comparator 35 is proportional to the divergence between the reference value and the torque measured.

As long as the level of said voltage remains lower than a predetermined value corresponding to a percentage of the nominal torque, the driving motor 2*a* of the winch remains stopped with the brake on.

When the voltage from comparator 35, for example a positive value, exceeds the predetermined threshold value, the detector D+ detects said excess and sends to apparatus 38 controlling the brake motor 2*a* a correction order for slackening the cable.

The apparatus 38 prepares the orders necessary for the correction:

1. Switching on motor 2*a* with the means necessary so that the torque developed by the motor is very weak.
2. Order for releasing the brake.

Apparatus 38 possesses means for measuring the speed of motor 2*a*.

As the driving torque due to the strain in the cable 30 is greater than the torque developed by motor 2*a*, the latter is driven in the unwinding direction. This action tends to slacken the cable and therefore to decrease the torque applied to the measurement shaft.

The voltage from comparator 35 therefore decreases and becomes lower than the detection threshold of the detector D+ and the correction order disappears.

A time-lag circuit delays the disappearance of the correction order in the motor control apparatus 38.

After this delay, apparatus 38 prepares the orders necessary for stopping motor 2*a:*

1. Bringing into play the means necessary so that the torque developed by the motor is equal to the maximum torque. This results in slowing down the motor.
12. Applying the brake and cutting the power supply to the motor when the speed of the motor is zero.

The time factor of said time-lag circuit is adjusted taking into account the stiffness of the cable 30 and the rotor inertia of motor 2*a* so that the strain measured at the end of the correction is very close to the reference value. This timing and the adjustment thereof are very important to avoid possible pumping.

In another connection, when the voltage from comparator 35 is a negative value and overruns the predetermined threshold, the detector D-detects said overrun and sends a correction order to apparatus 38 to tighten the cable 30.

Apparatus 38 prepares the orders necessary for said correction:

1. Switching on motor 2*a* with the means necessary so that the torque developed by the motor is equal to C max. (generally speaking 1.25 $C_N$).
2. Brake release control.

The torque developed by the motor is greater than the driving torque due to the strain in the cable. The motor starts to rotate in the winding direction. Said action increases the tension in the cable and therefore tends to increase the torque applied to the measurement shaft.

The voltage from comparator 35 decreases and becomes lower than the detection threshold of detector D− and the correction order disappears.

A second time-lag circuit delays the disappearance of the correction order in apparatus 38.

After this delay, the orders necessary for stopping the motor are prepared in apparatus 38:

1. Reduction of the torque developed by the motor to a low value. This action results in the motor being slowed down in response to the antagonistic torque induced by the tightening of the cable.
2. Application of the brake and cutting the power supply to the motor when the speed of the motor is zero.

As in the preceeding case, the time factor of said second delay circuit is adjusted so that the strain measured at the end of the correction is closed to the reference value.

The system makes it possible to make constant tension mooring winches using conventional alternative motors with coiled rotors for example without a particular device for torque control contrary to the constant tension mooring winches of the known type using continuous current motors with controlled torque and capable of remaining permanently blocked.

Figure 7:
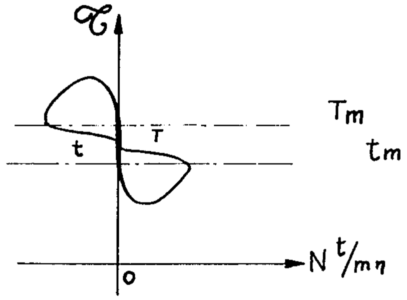
FIG. 7 is a diagram of the torques as functions of the rotary speed of the motor during adjustment of the tension in the cable.

FIG. 7 shows, in a diagram, the evolution of the pull $\rho$ as a function of the rotary speed N of the motor 2*a.* The values T*m* and *tm* are respectively the maximum and minimum values allowed for the tightening of the cable 30. The torque reference value abovementioned is between T*m* and *tm.* If the threshold values of both detectors D+ and D− are equal said torque reference value is the mean value of T*m* and *tm.* However the detectors D+ and D− can have different threshold values.

As shown in FIG. 7 the motor does not stop exactly when automatically ordered to do so (return to T*m* or *tm*) because of the inertie of the system and of said delay circuits.

Figure 8:
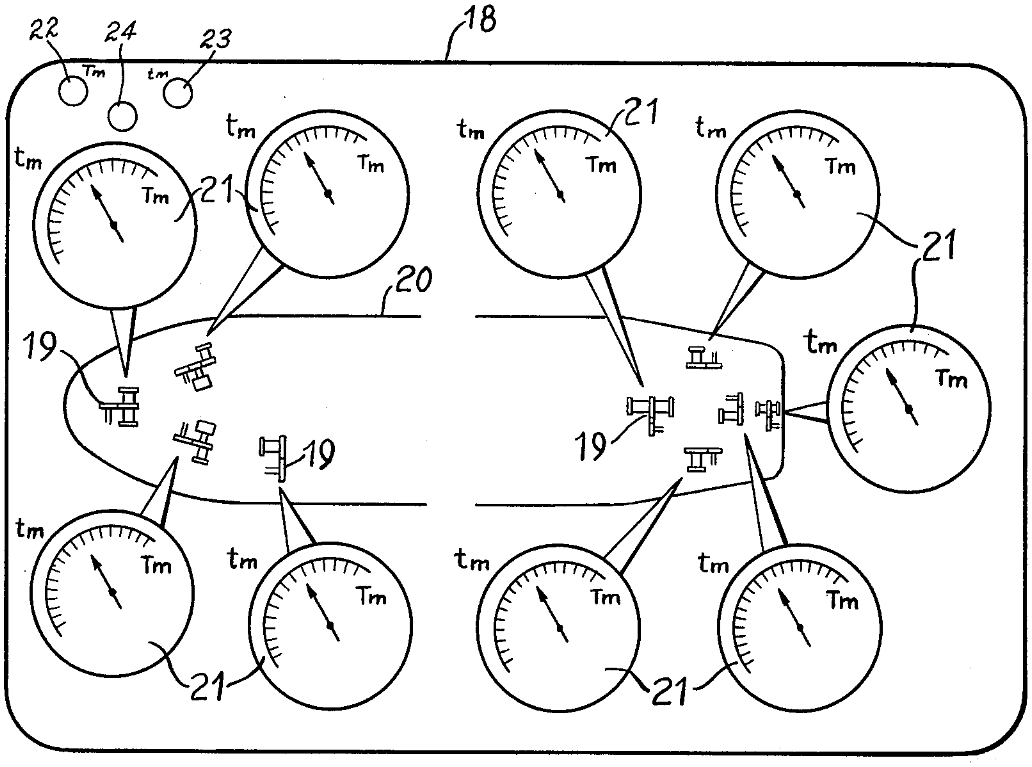
FIG. 8 is a front view of a console for controling mooring winches on a ship, using a device according to the invention.

This system of adjusting the tension in a cable may be mounted at different locations on a ship whose hawsers are then held under controled tension. FIG. 8 shows a control panel 18 with centralized controls. Mooring winches are shown schematically at 19 in a plan view of the ship 20. At each mooring locations 19,*a* dial 21 indicates the cables tension, that is to say the current variations in the corresponding stress gauges. It is easy to understand that by means of adjusting knobs such as 22 or 23 provided on the board 18, the T*m* and *tm* values may be altered, on one or several of the winches, in order to obtain a mooring appropriate to outward elements such as wind, current, etc. FIG. 8 shows knobs 22 and 23 only in connection with one of the dials illustrated. However, it is to be understood that such knobs may be provided for each of the dials shown. The control panel then also becomes one for controling the tension in different cables. The remote controls of T*m* and *tm* are of conventional type, either electrical or electronic.

To this centralization device may be joined an alarm and safety system such as shown at 24 in FIG. 8 in connection with only one of the dials thereon which is triggered for extreme values of cable tension, hence of torque on the drum; these values are not necessarily T*m* and *tm.* It is sufficient to detect the corresponding characteristics of the current passing by the stress gauges on another measuring member.

In the foregoing descriptions the amplifying and related circuits in housing 17, the indicating circuits for the dials of FIG. 8 and the control circuits under the control of knobs 22 and 23, along with the circuits for the signal means 24 may be well known circuit arrangements, know to those skilled in the art, and need not be described in further detail. Likewise, the manner of effecting control of the motor 2*a* by means of signals from the console 18 are also well known to those skilled in the art.

The invention is not restricted to the above described embodiments. The preferred application of the device according to the invention is the adjustment of the constant tension in a cable by a mooring winch aboard ships.

The device for measuring the torque by stress gauges on a stationary shaft carrying an intermediate gear-train may also be adopted on regulators or limitors of controlled torque.

What we claim is:

1. A torque controlling device comprising:

a drive motor, a driven cable windlass, a speed reducing interconnected between said drive motor and said driven windlass, said speed reducing device being driven by said motor and including at least one intermediate gear train comprising a unitary pinion and gear mounted for free rotation on a stationary shaft by axially spaced bearings, said shaft being supported at its ends on a fixed support;

at least one pair of stress gauges fixed to said shaft and arranged to respond to bending of said shaft to produce a signal proportional to the torque applied to said intermediate gear train by said motor; and means responsive to predetermined changes in said signal to regulate the torque delivered by said motor to said intermediate gear train.

2. A torque responsive device as defined in claim 1 wherein said speed reducing device is drivingly connected to said cable windlass to drive the same in a cable winding direction, said responsive means serving to stop said motor when the torque indicated by said signal reaches a predetermined maximum value.

3. A torque responsive device as defined in claim 2 wherein said responsive means serve to start said motor when the torque indicated by said signal falls below a predetermined minimum value.

4. A torque responsive device as defined in claim 3 wherein said motor is a braking-motor.

5. A torque responsive device as defined in claim 4 including means responsive to predetermined changes in said signal to regulate the torque delivered by said motor to said intermediate gear train, said means comprising amplifying means connected to said gauges, a comparing means connected to said amplifying means, a torque reference means connected to said comparing means, a detector means connected to said comparing means, and a controlling means connected to said detector and to said braking-motor.

6. A torque responsive device as defined in claim 5 including four strain gauges connected in a wheatstone bridge, said amplifying means comprising a preamplifier adjacent to said gauges and a remote adaptation amplifier.

7. A torque responsive device as defined in claim 6 wherein said detector means comprises a positive deviation detector and a negative deviation detector mounted in parallel, each acting by way of an appropriate relay on said controlling means.

8. A torque responsive device as defined in claim 7 wherein said controlling means further comprises a time delay means for delaying the orders sent to the braking-motor.

* * * * *